W. CAMP.
Bread-Toasters.
No. 155,789.                                Patented Oct. 13, 1874.
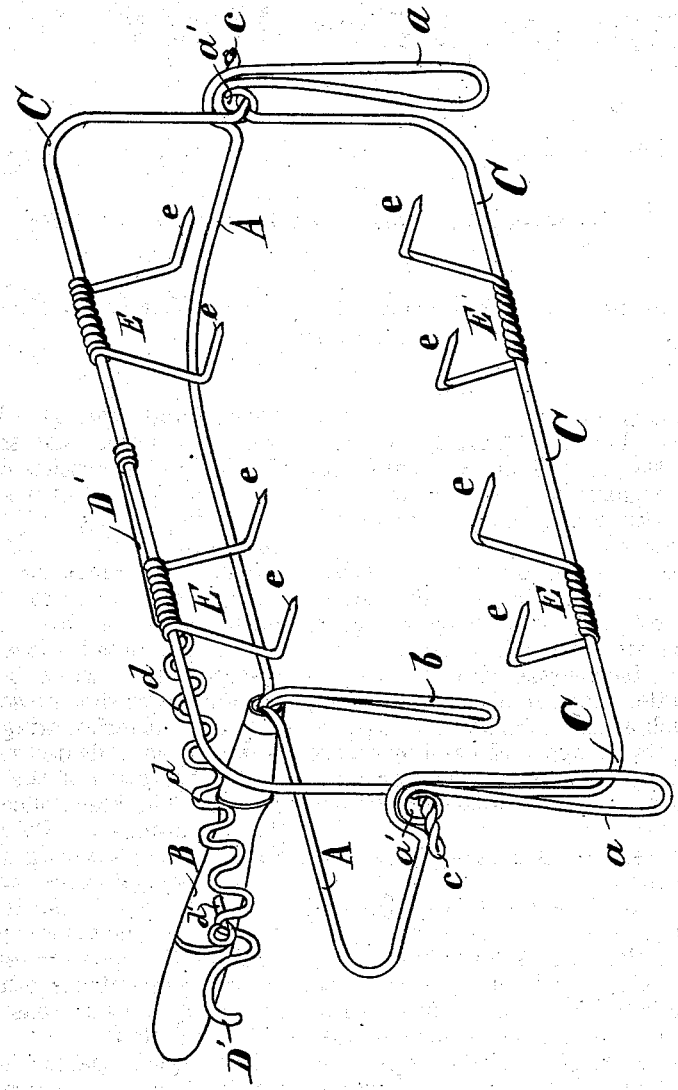
Witnesses:
Chas. F. Meisner
J. W. Herthel
Inventor:
William Camp
per Herthel & Co
Attys.

UNITED STATES PATENT OFFICE.

WILLIAM CAMP, OF KIRKWOOD, MISSOURI.

IMPROVEMENT IN BREAD-TOASTERS.

Specification forming part of Letters Patent No. 155,789, dated October 13, 1874; application filed February 17, 1874.

*To all whom it may concern:*

Be it known that I, WILLIAM CAMP, of Kirkwood, in the county of St. Louis and State of Missouri, have invented an Improved Bread-Toaster, (kitchen utensil,) of which the following is a specification:

This invention is an improved bread-toaster, so made as to be applicable for all ranges, stoves, grates, &c., and with which the toasting can be done with dispatch and in the most perfect manner. It consists entirely of wire, excepting its handle. Each chief part composing the toaster, such as main frame with legs, revolving frame, its prongs, and hand-lever, are all formed of respective wires, and arranged with each other in the manner as will now more fully appear.

The drawing represents a perspective view of my improvement.

A is the body-frame of the device. This is formed of wire, bent so as to have the legs or standards $a$ and the bearing-holes $a'$, respectively. The back of the frame A is fastened in a suitable handle, B. $b$ is a third leg or standard, of wire, also fastened to the handle B. The frame A, handle B, with legs, thus constitute the body of the device. Further, I provide the frame A with a revolving frame, C. This similarly consists of wire, bent in the shape indicated in the figure, and adapted, by means of its twisted end bearings $c$, to fit when placed in the bearings $a'$ of the frame A and revolve in same, the object of making the frame C revolve being to adapt or readily adjust same, according to the fire, in the required position to make the toast. Hence, to operate the frame C, as required, I provide same with a hand-lever, D. The hand-lever D is of the construction and shape indicated in the figure, having notches $d$ fitted to engage the frame part of A, as well as a projecting pin, $d'$, in the handle. The series of notches $d$ shown in the hand-lever is for the purpose of securing the revolving frame C in the different positions required and presented by the grate, stove, or fire. E are the prongs, to which the bread-slices are secured. These also consist of wires, bent or twisted to the top and lower rims presented by the revolving frame C, and terminating with the angle-shaped prongs $e$, as indicated in the figure.

The operation of the device is therefore as follows: The bread-slices are placed and held on the prongs $e$. By revolving the reel or frame C, and securing same in required inclination or position by means of the handle D, the device with bread is placed in front of the fire. After the toast is properly completed on one side the operator reverses the reel C, and so as to present the other bread side to the fire to be similarly toasted.

What I claim is—

The bread-toaster herein shown and described—that is, its frame A, having legs $a$, and provided with a single revolving reel, C, having prongs E $e$, notched handle D', and handle B proper, as and for the purpose set forth.

In testimony of said invention I have hereunto set my hand.

WILLIAM CAMP.

Witnesses:
WILLIAM W. HERTHEL,
CHAS. F. MEISNER.